2 Sheets—Sheet 1.
H. H. STIMPSON.
Cooking Range.
No. 956.
Reissued May 1, 1860.
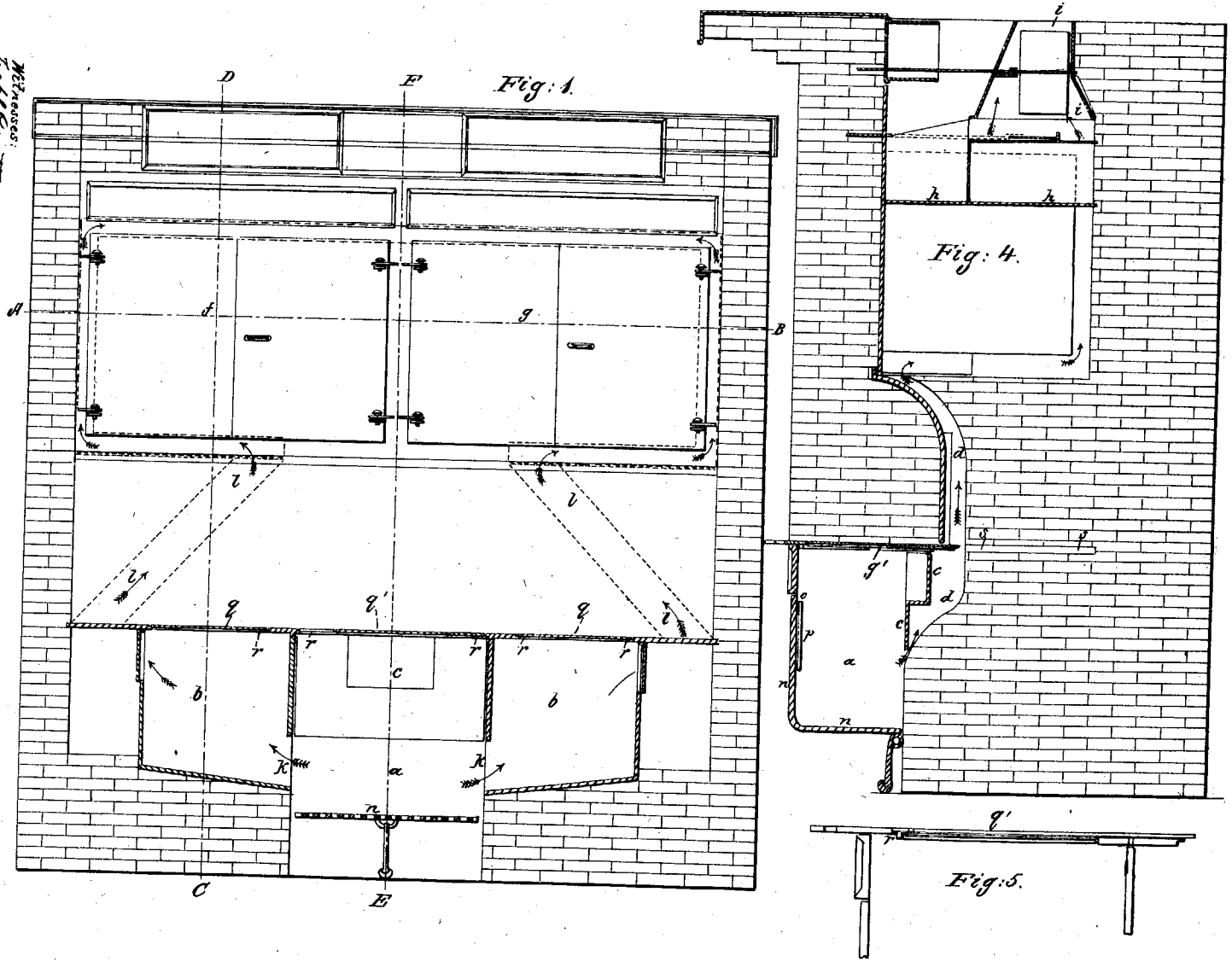
Witnesses:
Joseph Gavett
James H. Clapp.
Inventor:
H. H. Stimpson.
N. PETERS, Photo-Lithographer, Washington, D. C.

2 Sheets—Sheet 2.
H. H. STIMPSON.
Cooking Range.
No. 956.
Reissued May 1, 1860.
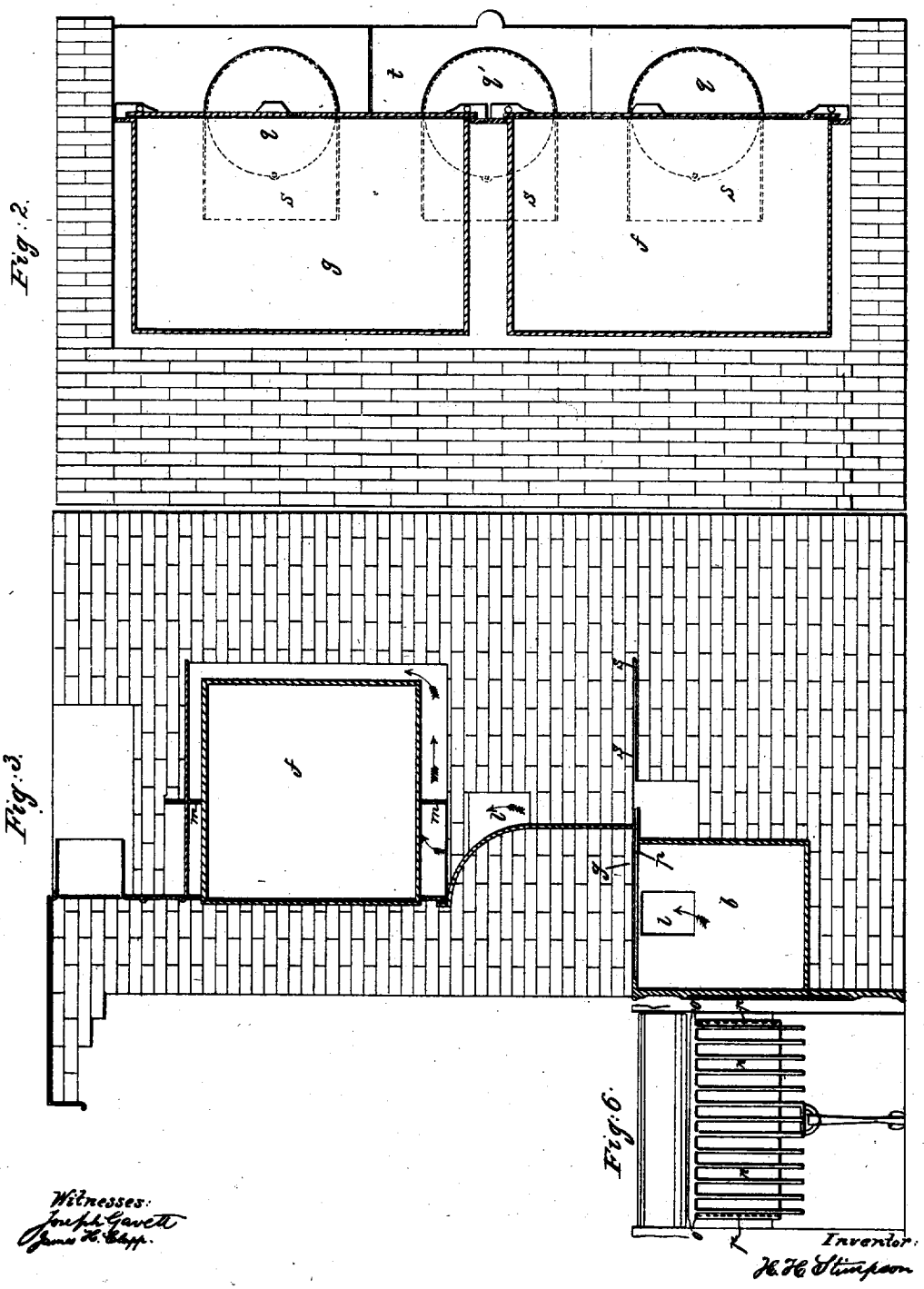
N. PETERS, Photo-Lithographer, Washington, D. C.

UNITED STATES PATENT OFFICE.

H. H. STIMPSON, OF BOSTON, MASSACHUSETTS.

IMPROVEMENT IN COOKING-RANGES.

Specification forming part of Letters Patent No. 23,509, dated April 5, 1859; Reissue No. 956, dated May 1, 1860.

*To all whom it may concern:*

Be it known that I, H. H. STIMPSON, of Boston, in the county of Suffolk and State of Massachusetts, have invented certain new and useful Improvements in Cooking-Ranges; and I do hereby declare that the following description, taken in connection with the accompanying drawings, hereinafter referred to, forms a full and exact specification of the same, wherein I have set forth the nature and principles of my said improvements by which my invention may be distinguished from all others of a similar class, together with such parts as I claim and desire to have secured to me by Letters Patent.

The figures of the accompanying plates of drawings represent my improvements.

In Plate 1, Figure 1 is a longitudinal vertical section taken through the fire-chamber, &c. Fig. 2, Plate 2, is a transverse horizontal section taken in the plane of the line A B, Fig. 1. Fig. 3, Plate 2, is a transverse vertical section taken in the plane of the line C D, Fig. 1, Plate 1. Fig. 4, Plate 2, is a transverse vertical section taken in the plane of the line E F, Fig. 1, Plate 2. Figs. 5 and 6, Plate 2, are views in detail, to be hereinafter referred to.

My improvements are made upon a cooking-range in which the ovens are heated by three separate and distinct flues, the side flues heating the front portion thereof, and the central flue the remainder, which is the principle embodied in the patent granted to me bearing date the 17th day of May, 1844.

My first improvement consists in so arranging the central main flue that the heat, &c., from the fire-chamber shall pass out of the same at a considerable distance below its top, instead of allowing it, by the ordinary construction of ranges, to impinge directly upon the top plate of the fire-chamber, or that which covers it, and which is the cause of their being rapidly burned out or warped. By thus conducting the heat away at so low a point in the fire-chamber the preservation of the top plate is insured, as the injurious effect of the heat upon it is prevented. This improvement also prevents the admission of cold air to the oven-flues, as any cold air admitted must necessarily, passing through the burning fuel, become heated before entering the main or central flue. The saving of fuel by this arrangement will be obvious, the amount required to heat the ovens, as I have practically demonstrated, being reduced at least one-third.

My second improvement consists in an arrangement of devices by which the expansion and contraction of the grate are prevented from injuriously affecting the remaining portions of the range or stove by throwing or pushing them apart, which has heretofore, by the ordinary construction of stove and range grates, been unavoidable. I effect this result by making the grate considerably narrower than the fire-chamber, and forming flanges or projections upon the side plates of the boiler-chambers, which overlap the space left between the ends of the grates and the sides of the boiler-chambers, the grate being loosely hung so as to allow its free expansion and contraction.

My third improvement consists in the use of sliding covers to the boiler-apertures, which are arranged so as to slide back and forth without being removed from the range. The ordinary circular covers heretofore used have proved very objectionable, as they are constantly liable to be dropped and broken, and those intended for the boiler-apertures, and cast thin for that purpose, are frequently placed over the fire-chamber instead of the the one intended therefor, and in consequence are soon burned out and destroyed. By my improvement these objections are obviated, as the covers cannot be removed from the range, and thus cannot be broken by being dropped, while there is no possibility of their being placed in other than their proper localities.

Having thus stated the general features of my invention, I will now proceed to describe its construction in detail.

*a a* in the drawings represent the fire-chamber, and *b b* the boiler-chambers. At the back of the fire-chamber *a a* is hung a short partition-plate, *c c*, in such manner as to leave a narrow space between it and the main flue *d d*, and that the communication of the flue *d d* with the fire-chamber is necessarily below the bottom of the partition-plate *c c*. By this arrangement the heated currents, &c., from the fire-chambers are prevented from ascending against and burning out or otherwise injuring the top plate, *e e*, of the fire-chamber, as they are made to escape at a considerable distance below the same, viz., under the bottom of the partition plate *c c*. The heat, &c., after entering the main flue *d d*, ascends, as shown by red arrows in the drawings, and diffuses itself about the flues of two elevated ovens, *f f g g*, being made to pass more particularly to the back of the ovens by means of partitions *h h*, and finally passes out of the chimney-flue *i i*.

The partition back plate, *c c*, is constructed somewhat narrower than the space between the sides of the boiler-chamber, so that a small opening will be left at either side between it and the boiler-chambers, and thereby allow the plate to expand and contract by the action of the various temperatures to which it is continually exposed without deteriorating or injuring the parts adjacent thereto; but, in order to prevent the products of combustion from passing through the openings or open space between the sides of the boiler-chamber and the lateral ends of the plate, I provide the former (the boiler-chamber) with flanges or projections wide enough to lap over the ends of the back plate in its contracted condition and thereby effect the closing of the open spaces referred to against the passage of the smoke or other products of combustion. The lateral flues receive the heated currents from the fire-chamber through openings *k k*, and conduct them, as shown by the arrows in the drawings, up the inclined flues *l l*, whence they are made to pass around the front parts of the ovens by partitions *m m*, and thence out the chimney-flues *i i*, as will be readily seen by inspection of the drawings.

The shutting off or opening the communication between the fire-chamber and the ovens is regulated by proper valves or dampers in such a manner as to conduct the heat about the ovens by either the lateral flues or the main flues, or by all at once, as may be desirable. *n n* is the grate, hung loosely upon pivots *o o*, which enter corresponding holes formed in the side plates of the boiler-chambers. The grate, as will be seen by Plate 2, is made much narrower than the space between the boiler-chambers, and rests against flanges or projections *p p*, attached to the side plates of the boiler-chambers, and fill up the spaces between them and the grate, and thus prevent the fuel from falling out or air from going in. By this arrangement the expansion and contraction of the grate cannot push apart the other portions of the range, or otherwise injuriously affect them. The advantage of this result will be apparent to manufacturers of ranges, &c., as the expansion and the contraction of the grate, and the consequent deterioration of the adjacent parts, has proved a serious annoyance.

Instead of the circular covers heretofore used for the boiler-apertures and the disadvantages of which, by breaking and burning out, &c., are well known and apparent, I use sliding covers *q q q*, which slide in proper grooves or ways *r r*, formed in the top plate, and can be pushed under the ovens into a space, *s s*, formed to receive them. By this means the boiler-apertures can be rapidly and readily covered and uncovered without danger of breaking or possibility of dropping them, or placed in other than their proper relative positions. The central sliding cover, *q′*, is placed in a sliding plate, *t*, so that the whole fire-chamber can be uncovered for boiling purposes, &c.

Having thus stated my improvements, what I claim as my invention, and desire to have secured to me by Letters Patent, is—

1. The combination of the flanges or projections attached to the side plates of the boiler chambers, with the grate constructed so as to admit air to the fuel from below, and hung so as to allow of its free play, and made narrower than the fire-chamber, as described, whereby the contraction and expansion of the grate are prevented from injuriously affecting the remaining portions of the range or stove.

2. In combination with the back plate, constructed as described, providing the boiler-chamber with flanges or projections of such shape and width as to lap over the lateral end of said back plate, whereby the plate is allowed to expand and contract without deteriorating the parts adjacent thereto and without leaving open spaces for the escape at the sides of the products of combustion, substantially as herein set forth.

3. The use of the sliding covers *q q*, in combination with the top-plate, arranged to operate substantially as described.

H. H. STIMPSON.

Witnesses:
GEO. LINCOLN,
WM. SCHOULER.